US011518369B2

(12) United States Patent
Sato et al.

(10) Patent No.: US 11,518,369 B2
(45) Date of Patent: Dec. 6, 2022

(54) VEHICLE CONTROL DEVICE

(71) Applicant: Toyota Jidosha Kabushiki Kaisha, Toyota (JP)

(72) Inventors: Kenji Sato, Toyota (JP); Kei Yamamoto, Toyota (JP); Takashi Nishimoto, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 17/145,818

(22) Filed: Jan. 11, 2021

(65) Prior Publication Data

US 2021/0221356 A1 Jul. 22, 2021

(30) Foreign Application Priority Data

Jan. 17, 2020 (JP) .............................. JP2020-005606

(51) Int. Cl.
*B60W 30/045* (2012.01)
*B60W 10/20* (2006.01)
*B60W 10/22* (2006.01)

(52) U.S. Cl.
CPC .......... *B60W 30/045* (2013.01); *B60W 10/20* (2013.01); *B60W 10/22* (2013.01); *B60W 2520/16* (2013.01); *B60W 2520/18* (2013.01)

(58) Field of Classification Search
CPC .... B60W 30/045; B60W 10/20; B60W 10/22; B60W 2520/16; B60W 2520/18; B60W 2540/00; B60W 2720/16; B60W 2720/18; B60W 10/04; B60G 2204/62; B60G 2300/45; B60G 2400/40; B60G 2600/20; B60G 2800/012; B60G 2800/014; B60G 17/0162; B62D 1/04; B62D 1/12; B60K 2370/133
USPC .......................................................... 701/37
See application file for complete search history.

(56) References Cited

U.S. PATENT DOCUMENTS

| | | | | |
|---|---|---|---|---|
| 5,335,743 | A | * | 8/1994 | Gillbrand .................. B60T 7/08 200/61.54 |
| 5,452,919 | A | * | 9/1995 | Hoyle ................ B60G 17/0523 280/5.514 |
| 5,540,298 | A | * | 7/1996 | Yoshioka ................. B62D 6/00 303/193 |
| 2002/0116104 | A1 | * | 8/2002 | Kawashima ........... B60G 7/006 280/5.515 |
| 2006/0284587 | A1 | * | 12/2006 | Teshima ............... B60N 2/0248 318/567 |
| 2015/0259008 | A1 | * | 9/2015 | Seguchi ............... B62D 15/025 701/41 |
| 2016/0123261 | A1 | * | 5/2016 | Shibata ................. F02D 41/045 701/112 |
| 2017/0334420 | A1 | * | 11/2017 | Kato ..................... B60W 50/10 |
| 2017/0334453 | A1 | * | 11/2017 | Mimura ........... B60W 50/0098 |

(Continued)

FOREIGN PATENT DOCUMENTS

JP 2007-045225 A 2/2007

*Primary Examiner* — Jonathan M Dager
*Assistant Examiner* — Jean W Charleston
(74) *Attorney, Agent, or Firm* — Dinsmore & Shohl LLP

(57) ABSTRACT

A vehicle control device includes an operation unit operated by a driver; and a controller that causes a vehicle to turn according to a movement of the operation unit and causes a height of the vehicle to be changed. The controller causes the height of the vehicle to be changed according to an upward or downward movement of the operation unit.

6 Claims, 4 Drawing Sheets

(56) References Cited

U.S. PATENT DOCUMENTS

2018/0031124 A1\* 2/2018 Ota .................. F16H 61/686
2021/0362848 A1\* 11/2021 Spencer ............. B64D 17/025

\* cited by examiner

VEHICLE CONTROL DEVICE

CROSS REFERENCE TO RELATED APPLICATION

This application claims priority to Japanese Patent Application No. 2020-005606 filed on Jan. 17, 2020, which is incorporated herein by reference in its entirety including the specification, claims, drawings, and abstract.

TECHNICAL FIELD

The present disclosure relates to a vehicle control device having a new function.

BACKGROUND

In recent years, there has been proposed a technique by which a vehicle is automatically controlled according to the state of the vehicle, aiming at control stability of the vehicle. For example, in a vehicle using an air suspension unit, there has been proposed a technique by which when the loads of front and rear wheels are changed, while the vehicle height is maintained constant, the spring constant of the air suspension unit is changed in order to increase roll rigidity, thereby aiming at control stability of the vehicle (for example, JP 2007-45225 A).

SUMMARY

Incidentally, there is a demand to enjoy driving with a sense of unity with the vehicle. However, in the technique of related art described in JP 2007-45225 A, regardless of an intention of a driver, the vehicle is automatically controlled to aim at control stability and in many cases, the driver does not feel a sense of unity with the vehicle.

Therefore, an object of the present disclosure is to provide a vehicle control device by which a driver can feel a sense of unity with a vehicle during drive operation.

According to an aspect of the present disclosure, there is provided a vehicle control device including: an operation unit operated by a driver; and a controller that causes a vehicle to turn according to a movement of the operation unit and causes a height of the vehicle to be changed, in which the controller causes the height of the vehicle to be changed according to an upward or downward movement of the operation unit.

Accordingly, the height of the vehicle can be changed according to an operation performed by the driver, and the driver can feel a sense of unity with the vehicle during drive operation.

In the vehicle control device according to the aspect of the present disclosure, the vehicle may include suspension units that suspend front left, front right, rear left, and rear right wheels, respectively, a height of each of the suspension units may be independently changeable, and the controller may cause heights of right and left suspension units of the vehicle or heights of front and rear suspension units of the vehicle to be changed according to the movement of the operation unit to change a roll angle of the vehicle or a pitch angle of the vehicle.

As described above, a roll state or a pitch state of the vehicle can be changed according to an operation performed by the driver, and the driver can feel a greater sense of unity with the vehicle during drive operation.

In the vehicle control device according to the aspect of the present disclosure, the operation unit may include a shaft that rotates to be inclined in a forward and rearward direction of the vehicle and is rotatable around a central axis in a twisting direction, a grip portion that is mounted at an upper end of the shaft to be movable in an upward and downward direction, an inclination angle sensor that detects an inclination angle of the shaft in the forward and rearward direction of the vehicle, a twist angle sensor that detects a twist angle of the shaft, and a position sensor that detects a position of the grip portion with respect to the shaft in the upward and downward direction, and the controller may cause the vehicle to accelerate or decelerate according to a signal input from the inclination angle sensor, cause the vehicle to turn according to a signal input from the twist angle sensor, and cause the height of the vehicle to be changed according to a signal input from the position sensor.

In addition, in the vehicle control device according to the aspect of the present disclosure, when the signal from the twist angle sensor and a signal from the position sensor, which indicates that the grip portion is moved in an upward direction, are input at the same time, the controller may cause the vehicle to turn right or left and cause the heights of the front and rear suspension units, which are positioned on an outside of turning, to be increased, and when the signal from the twist angle sensor and a signal from the position sensor, which indicates that the grip portion is moved in a downward direction, are input at the same time, the controller may cause the vehicle to turn right or left and cause the heights of the front and rear suspension units, which are positioned on an inside of turning, to be decreased.

In addition, in the vehicle control device according to the aspect of the present disclosure, when the signal from the inclination angle sensor and the signal from the position sensor, which indicates that the grip portion is moved in the upward direction, are input at the same time, the controller may cause the vehicle to accelerate or decelerate and cause the heights of the front or rear suspension units of the vehicle to be increased, and when the signal from the inclination angle sensor and the signal from the position sensor, which indicates that the grip portion is moved in the downward direction, are input at the same time, the controller may cause the vehicle to accelerate or decelerate and cause the heights of the front or rear suspension units of the vehicle to be decreased.

Accordingly, the operation of the grip portion by the driver matches the operation of the vehicle, and thus the driver can feel a sense of unity with the vehicle during drive operation.

The present disclosure can provide the vehicle control device by which the driver can feel a sense of unity with the vehicle during drive operation.

BRIEF DESCRIPTION OF DRAWINGS

Embodiment(s) of the present disclosure will be described based on the following figures, wherein.

DESCRIPTION OF EMBODIMENTS

Hereinafter, a vehicle control device 100 of an embodiment will be described with reference to the drawings.

Incidentally, arrow FR, arrow UP, and arrow RH in each drawing represent a forward direction (advancing direction), an upward direction, and a right direction of a vehicle 10, respectively. In addition, directions opposite to arrows FR, UP, and RH represent a rearward direction, a downward direction, and a left direction of the vehicle. In the following description, unless otherwise specified, the front and the rear, the right and the left, and the up and the down in the direction represent the front and the rear in a forward and rearward direction of the vehicle, the right and the left in a right and left direction of the vehicle (vehicle width direction), and up and down in an upward and downward direction of the vehicle, respectively.

Figure 1:
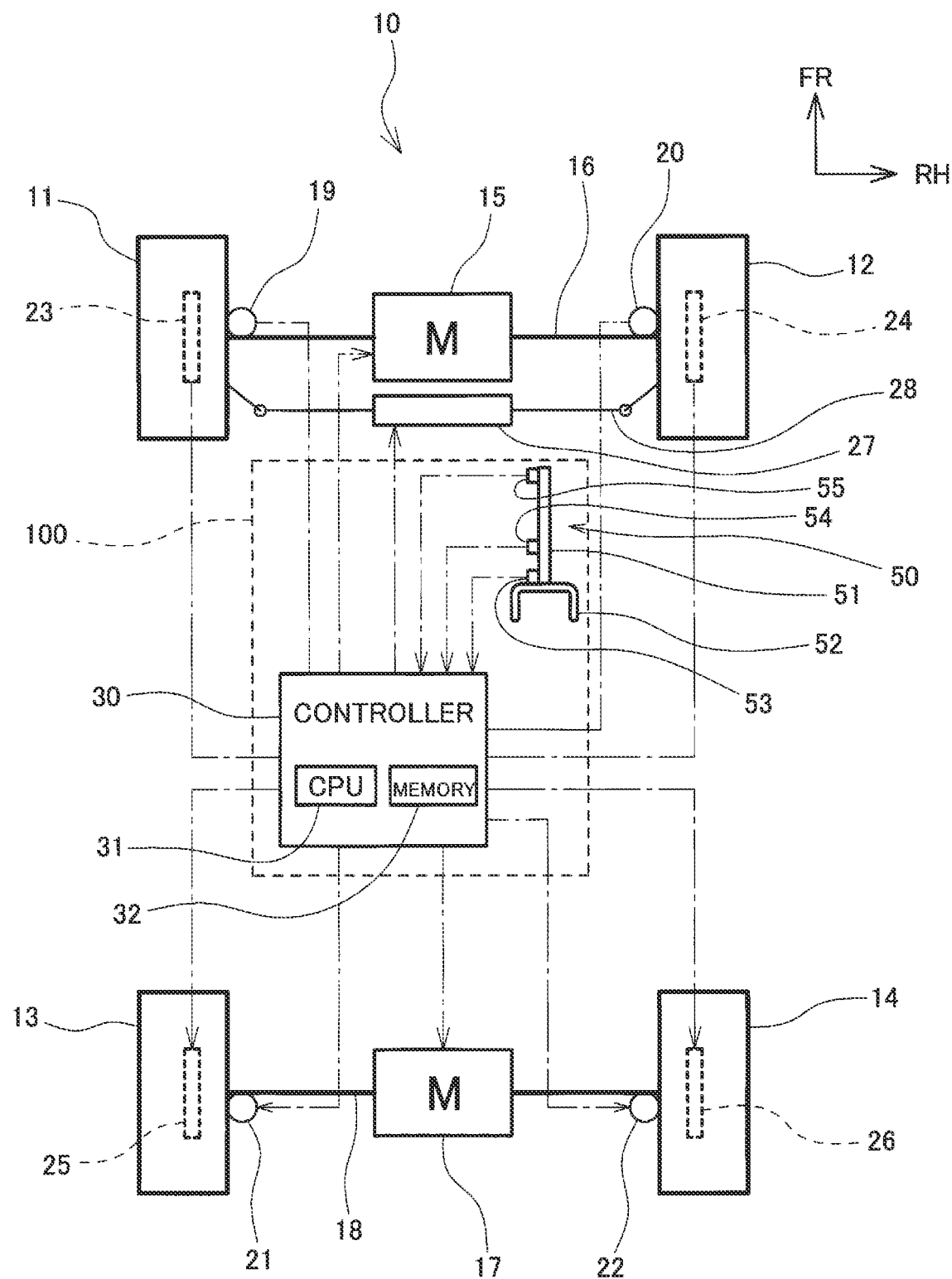
FIG. 1 is a plan view illustrating a vehicle in which a vehicle control device of an embodiment is mounted.

Initially, the vehicle 10 in which the vehicle control device 100 is mounted will be described with reference to FIG. 1. As illustrated in FIG. 1, the vehicle 10 includes left and right front wheels 11 and 12, left and right rear wheels 13 and 14, a front wheel motor 15 that drives the left and right front wheels 11 and 12, and a rear wheel motor 17 that drives the left and right rear wheels 13 and 14. The left and right front wheels 11 and 12 and the front wheel motor 15 are connected to a front drive shaft 16, and the left and right rear wheels 13 and 14 and the rear wheel motor 17 are connected to a rear drive shaft 18. The front wheels 11 and 12 are steered wheels, and are connected to an electric power steering unit 27 via a link mechanism 28. The electric power steering unit 27 includes a drive device such as a motor thereinside, and drives the link mechanism 28 to steer the front wheels 11 and 12. In addition, brake units 23, 24, 25, and 26 are mounted in the front wheels 11 and 12 and the rear wheels 13 and 14, respectively.

The front wheels 11 and 12 and the rear wheels 13 and 14 are connected to a body (not illustrated) of the vehicle 10 via air suspension units 19, 20, 21, and 22, respectively. Each of the front left, front right, rear left, and rear right suspension units 19 to 22 is a combination of an air spring including an air cylinder and a shock absorber, and allows air in and out of the air cylinder to change the height of the vehicle.

Figure 2:
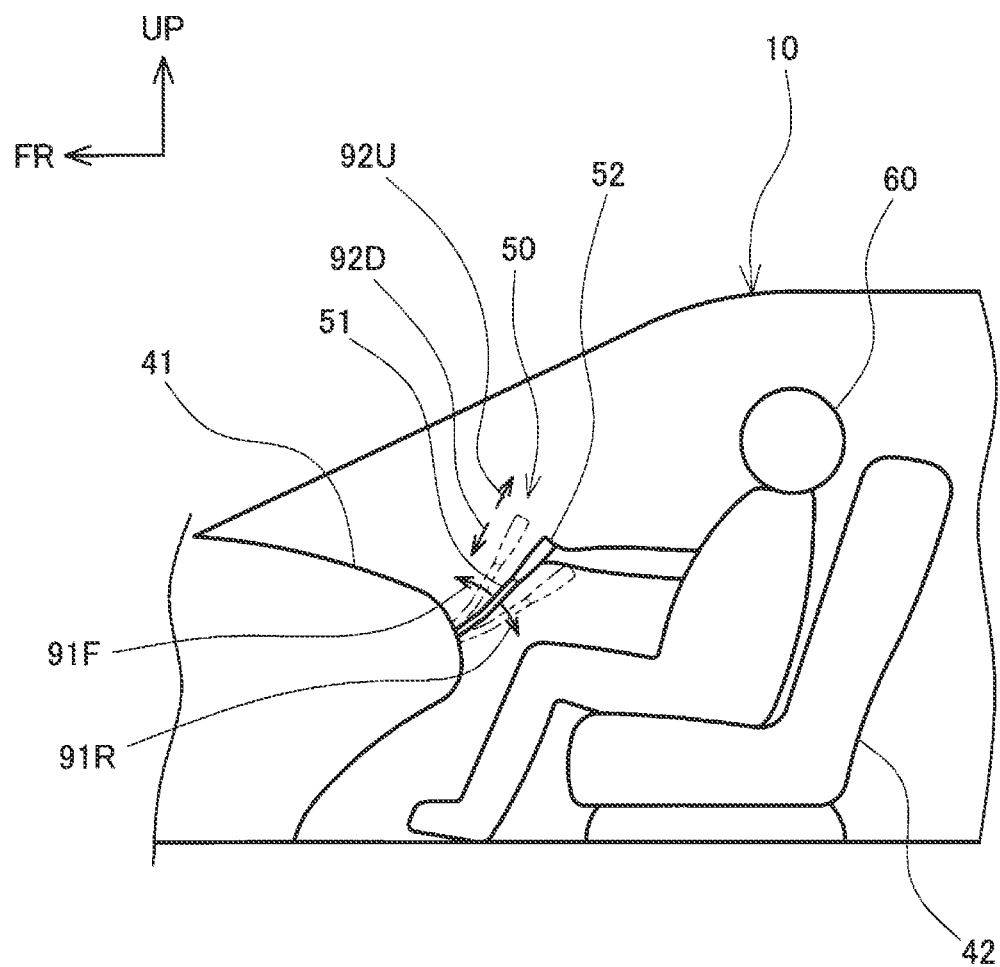
FIG. 2 is a schematic side view of the vehicle in which an operation unit of the vehicle control device of the embodiment is mounted.

An operation unit 50 includes a shaft 51, and a grip portion 52 that has a U shape and is mounted at an upper end of the shaft 51. As illustrated in FIG. 2, the operation unit 50 is mounted to protrude from an instrument panel 41 of the vehicle 10 toward the interior of the vehicle. The shaft 51 of the operation unit 50 is mounted in the body of the vehicle 10 such that the shaft 51 rotates to be inclined in the forward and rearward direction of the vehicle as indicated by arrows 91F and 91R in FIG. 2 and is rotatable around a central axis 59 as indicated by arrow 94 in FIG. 3. In addition, as indicated by arrows 92U and 92D in FIG. 2 and arrows 95U and 95D in FIG. 3, the grip portion 52 of the operation unit 50 is mounted at the upper end of the shaft 51 to be movable with respect to the shaft 51 in the upward and downward direction.

As illustrated in FIG. 1, a position sensor 53 that detects the position of the grip portion 52 with respect to the shaft 51 in the upward and downward direction, a twist angle sensor 54 that detects a twist angle of the shaft 51, and an inclination angle sensor 55 that detects an inclination angle of the shaft 51 in the forward and rearward direction of the vehicle are mounted in the shaft 51. As illustrated in FIG. 2, a driver 60 sitting in a driver's seat 42 grasps and operates the grip portion 52 of the operation unit 50 with the hand to be able to drive, stop, and turn the vehicle 10 and change the vehicle height of the vehicle 10.

As illustrated in FIG. 1, a controller 30 is a computer including a CPU 31 that is a processor which internally performs information processing, and a memory 32 that stores a program or control data. A signal from the position sensor 53, a signal from the twist angle sensor 54, and a signal from the inclination angle sensor 55 are input to the controller 30. In addition, the front wheel motor 15, the rear wheel motor 17, the suspension units 19 to 22, the brake units 23 to 26, and the electric power steering unit 27 are connected to the controller 30, and operate according to a command from the controller 30. The operation unit 50 and the controller 30 form the vehicle control device 100.

As indicated by the arrow 91F in FIG. 2, when the driver 60 tilts the shaft 51 of the operation unit 50 in the forward direction of the vehicle 10, the inclination angle sensor 55 mounted in the shaft 51 which is illustrated in FIG. 1 detects the inclination angle of the shaft 51 in the forward and rearward direction of the vehicle to output the inclination angle to the controller 30. The controller 30 causes the front wheel motor 15 and the rear wheel motor 17 of the vehicle 10 to accelerate, start, decelerate, or stop the vehicle 10 according to the signal input from the inclination angle sensor 55. For example, when a signal indicating that the shaft 51 is inclined toward the front of the vehicle is input from the inclination angle sensor 55, the controller 30 may cause the front wheel motor 15 and the rear wheel motor 17 of the vehicle 10 to increase an output to accelerate the vehicle 10. In addition, when a signal indicating that the shaft 51 is inclined toward the rear of the vehicle is input from the inclination angle sensor 55, the controller 30 may cause the front wheel motor 15 and the rear wheel motor 17 to decrease an output or cause the brake units 23 to 26 to operate to decelerate or stop the vehicle 10.

Figure 3:
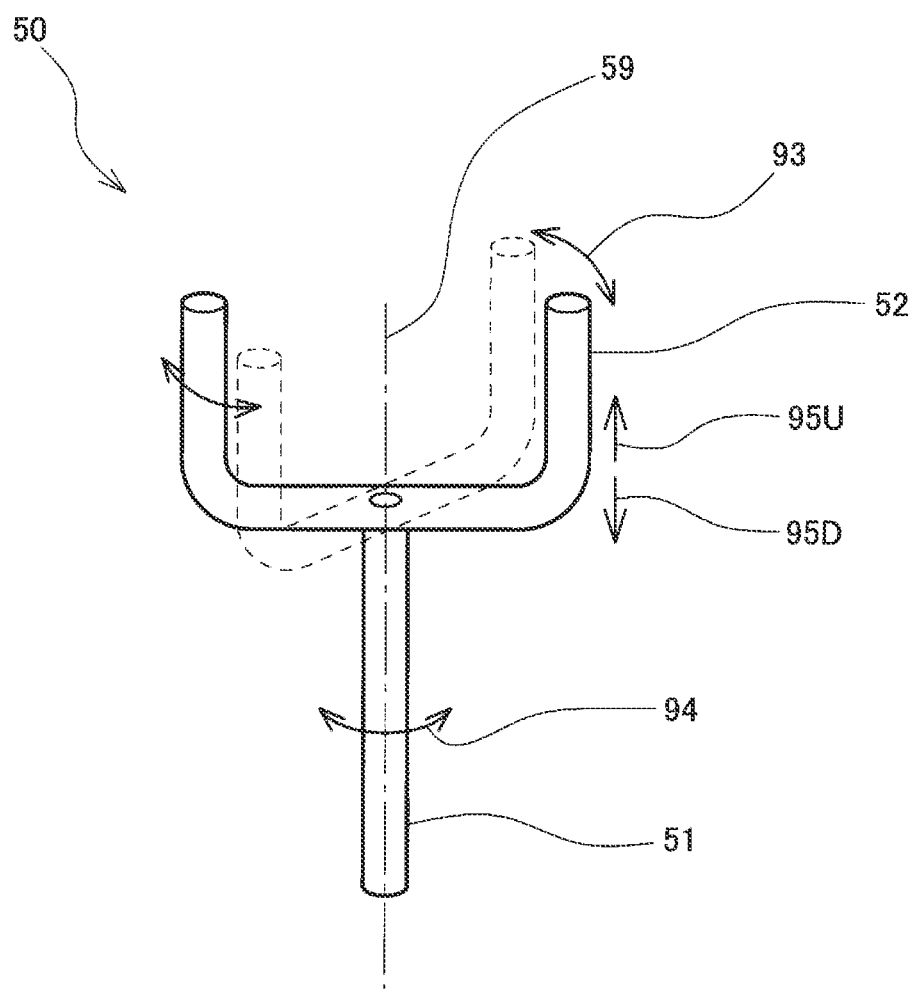
FIG. 3 is a perspective view of the operation unit of the vehicle control device of the embodiment.

In addition, as indicated by the arrow 92U in FIG. 2 and the arrow 95U in FIG. 3, when the driver 60 moves the grip portion 52 of the operation unit 50 in the upward direction, the position sensor 53 mounted in the shaft 51 which is illustrated in FIG. 1 detects the position of the grip portion 52 with respect to the shaft 51 in the upward and downward direction to output the position to the controller 30. The controller 30 causes the heights of four suspension units 19 to 22 to be changed according to the signal input from the position sensor 53 to change a roll angle or a pitch angle of the vehicle 10.

In addition, as indicated by arrows 93 and 94 in FIG. 3, when the driver 60 rotates the grip portion 52 to twist the shaft 51 around the central axis 59, the twist angle sensor 54 mounted in the shaft 51 which is illustrated in FIG. 1 detects the twist angle of the shaft 51 to output the twist angle to the controller 30. The controller 30 causes the electric power steering unit 27 to operate according to the signal input from the twist angle sensor 54 to steer the right and left front wheels 11 and 12, thereby turning the vehicle 10 right or left.

As described above, the driver 60 operates the grip portion 52 to incline the shaft 51 in the forward and rearward direction of the vehicle 10 and thereby can accelerate or decelerate the vehicle 10, operates the grip portion 52 to rotate the shaft 51 in a twisting direction and thereby can turn the vehicle 10 right or left, or moves the grip portion 52 upward and downward and thereby can change the roll angle or pitch angle of the vehicle 10. The driver 60 operates the grip portion 52 in a combination of three operation directions to be able to control the vehicle 10 in various ways.

For example, when the driver 60 operates the grip portion 52 in a counterclockwise direction as indicated by a broken line in FIG. 3 as viewed from the upward direction of the vehicle 10, the controller 30 causes the vehicle 10 to turn in the left direction. At the same time, when the driver 60 moves the grip portion 52 in the upward direction as indicated by arrow 95U in FIG. 3, the controller 30 allows air to be introduced into the air cylinders of the suspension units 20 and 22, which support the right front wheel 12 and the right rear wheel 14, to cause the heights of the suspension units 20 and 22 to be increased, thereby increasing the height on a right side of the vehicle 10, the right side being the outside of turning. Accordingly, the controller 30 controls the roll angle of the vehicle 10 such that the vehicle 10 is inclined in the left direction during left turning. On the contrary, when the driver 60 operates the grip portion 52 in a clockwise direction as viewed from the upward direction of the vehicle 10 and at the same time, moves the grip portion 52 in the upward direction, the controller 30 causes the vehicle 10 to turn in the right direction and causes the heights of the suspension units 19 and 21 on a left side of the vehicle 10 to be increased, the left side being the outside of turning, thereby controlling the roll angle of the vehicle 10 such that the vehicle 10 is inclined in the right direction during right turning.

In addition, when the driver 60 operates the grip portion 52 in the counterclockwise direction as viewed from the upward direction of the vehicle 10 and at the same time, moves the grip portion 52 in the downward direction as indicated by arrow 95D in FIG. 3, the controller 30 causes the vehicle 10 to turn left and causes the heights of the suspension units 19 and 21 on the left side of the vehicle 10 to be decreased, the left side being the inside of turning, thereby controlling the roll angle of the vehicle 10 such that the vehicle 10 is inclined in the left direction during left turning. In addition, when the driver 60 operates the grip portion 52 in the clockwise direction as viewed from the upward direction of the vehicle 10 and at the same time, moves the grip portion 52 in the downward direction, the controller 30 causes the vehicle 10 to turn right and causes the heights of the suspension units 20 and 22 on the right side of the vehicle 10 to be decreased, the right side being the inside of turning, thereby controlling the roll angle of the vehicle 10 such that the vehicle 10 is inclined in the right direction during right turning.

In addition, when the driver 60 inclines the grip portion 52 toward the front of the vehicle 10 as indicated by the arrow 91F in FIG. 2 and at the same time, moves the grip portion 52 in the upward direction as indicated by the arrow 92U in FIG. 2, the controller 30 causes the vehicle 10 to accelerate and allows air to be introduced into the air cylinders of the suspension units 19 and 20, which support the front wheels 11 and 12 of the vehicle 10, to cause the heights of the suspension units 19 and 20 to be increased, thereby controlling the pitch angle of the vehicle 10 such that the front of the vehicle 10 is slightly raised. On the contrary, when the driver 60 inclines the grip portion 52 toward the front of the vehicle 10 and at the same time, moves the grip portion 52 in the downward direction as indicated by the arrow 92D in FIG. 2, the controller 30 causes the vehicle 10 to accelerate and allows air to be discharged from the air cylinders of the suspension units 19 and 20, which support the front wheels 11 and 12 of the vehicle 10, to cause the heights of the suspension units 19 and 20 to be decreased, thereby controlling the pitch angle of the vehicle 10 such that the front of the vehicle 10 is slightly sunk.

Furthermore, when the driver 60 inclines the grip portion 52 toward the rear of the vehicle 10 as indicated by the arrow 91R in FIG. 2 and at the same time, moves the grip portion 52 in the downward direction as indicated by the arrow 92D in FIG. 2, the controller 30 causes the vehicle 10 to decelerate and causes the heights of the suspension units 21 and 22 to be decreased, the suspension units 21 and 22 supporting the rear wheels 13 and 14 of the vehicle 10, thereby controlling the pitch angle of the vehicle 10 such that the rear of the vehicle 10 is sunk. On the contrary, when the driver 60 inclines the grip portion 52 toward the rear of the vehicle 10 and at the same time, moves the grip portion 52 in the upward direction as indicated by the arrow 92U, the controller 30 causes the vehicle 10 to decelerate and causes the heights of the suspension units 21 and 22 to be increased, the suspension units 21 and 22 supporting the rear wheels 13 and 14 of the vehicle 10, thereby controlling the pitch angle of the vehicle 10 such that the rear of the vehicle 10 is raised.

As described above, since the driver 60 simply operates the grip portion 52 to enable the vehicle control device 100 of the embodiment to accelerate, decelerate, or turn the vehicle 10 and freely change the roll angle and the pitch angle of the vehicle 10, the driver 60 can feel a sense of unity with the vehicle 10 during drive operation.

Incidentally, in the above description, the vehicle 10 includes the air suspension units 19 to 22 and allows air in and out of the air cylinders to change the heights thereof; however, the present disclosure is not limited to the configuration, and may employ a suspension unit which is a combination of a suspension device including a coil spring and a shock absorber, and a hydraulic cylinder whose height is adjustable.

Figure 4:
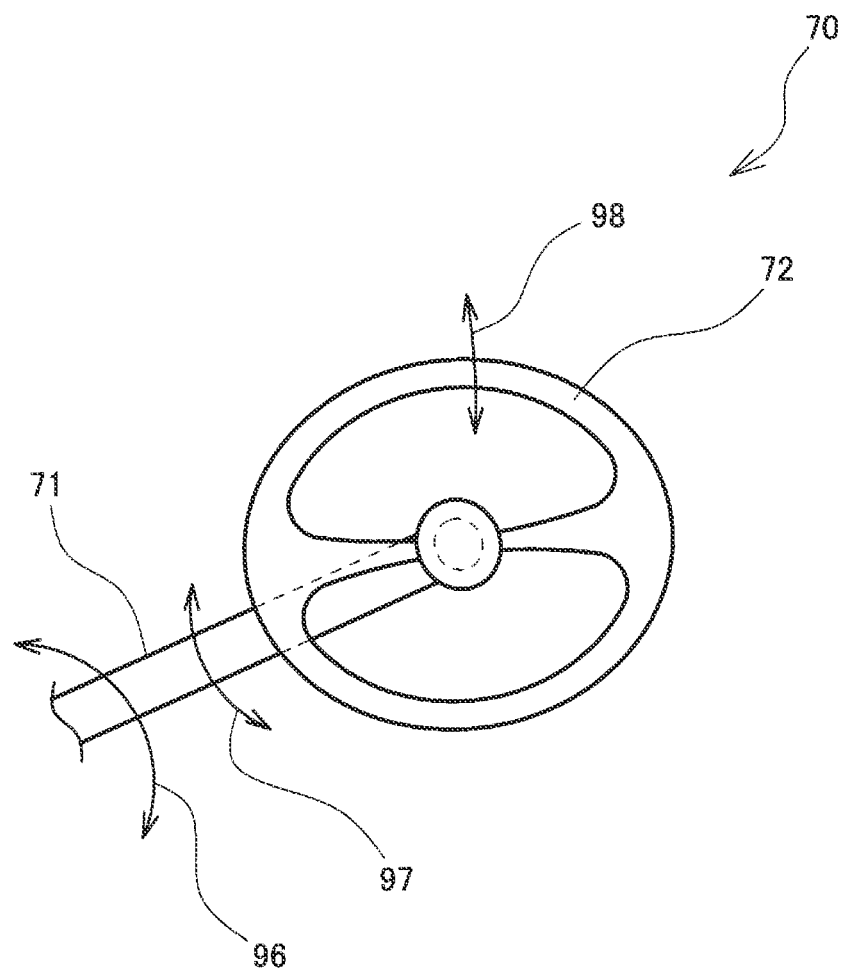
FIG. 4 is a perspective view of an operation unit of a vehicle control device of another embodiment.

In the operation unit 50 of the vehicle control device 100 of the embodiment described above, the grip portion 52 has a U shape; however, the present disclosure is not limited thereto, and for example, as illustrated in FIG. 4, the operation unit may be configured as an operation unit 70 including a rotary handle 72 and a shaft 71. When the driver 60 operates the handle 72 of the operation unit 70 to incline the shaft 71 in the forward and rearward direction of the vehicle as indicated by arrow 96 in FIG. 4, the controller 30 causes the vehicle 10 to accelerate or decelerate. In addition, when the driver 60 moves the handle 72 in the upward and downward direction as indicated by arrow 98 in FIG. 4, the controller 30 causes the suspension units 19 to 22 to operate to change the roll angle and the pitch angle of the vehicle 10. Furthermore, when the driver 60 rotates the handle 72 as indicated by arrow 97 in FIG. 4, the controller 30 can cause the vehicle 10 to turn right or left.

Even when the vehicle control device 100 is configured to employ the operation unit 70 illustrated in FIG. 4, the same effects as when the vehicle control device 100 is configured to employ the operation unit 50 are achieved.

The invention claimed is:

1. A vehicle control device comprising:
an operation unit operated by a driver; and
a controller that causes a vehicle to turn according to a movement of the operation unit and causes a height of the vehicle to be changed,
wherein the vehicle includes suspension units, a height of each of the suspension units is independently changeable,
wherein the controller causes the height of the vehicle to be changed according to an upward or downward movement of the operation unit.

2. The vehicle control device according to claim 1,
wherein the suspension units suspend front left, front right, rear left, and rear right wheels, respectively, and the controller causes heights of right and left suspension units of the vehicle or heights of front and rear suspension units of the vehicle to be changed according to the movement of the operation unit to thereby change a roll angle of the vehicle or a pitch angle of the vehicle.

3. The vehicle control device according to claim 2,
wherein the operation unit includes a shaft that rotates to be inclined in a forward and rearward direction of the vehicle and is rotatable around a central axis in a twisting direction, a grip portion that is mounted at an upper end of the shaft to be movable in an upward and downward direction, an inclination angle sensor that detects an inclination angle of the shaft in the forward and rearward direction of the vehicle, a twist angle sensor that detects a twist angle of the shaft, and a position sensor that detects a position of the grip portion with respect to the shaft in the upward and downward direction, and
wherein the controller causes the vehicle to accelerate or decelerate according to a signal input from the inclination angle sensor, causes the vehicle to turn according to a signal input from the twist angle sensor, and causes the height of the vehicle to be changed according to a signal input from the position sensor.

4. The vehicle control device according to claim 3,
wherein when the signal from the twist angle sensor and a signal from the position sensor, which indicates that the grip portion is moved in an upward direction, are input at the same time, the controller causes the vehicle to turn right or left and causes the heights of the front and rear suspension units, which are positioned on an outside of turning, to be increased, and
when the signal from the twist angle sensor and a signal from the position sensor, which indicates that the grip portion is moved in a downward direction, are input at the same time, the controller causes the vehicle to turn right or left and causes the heights of the front and rear suspension units, which are positioned on an inside of turning, to be decreased.

5. The vehicle control device according to claim 3,
wherein when the signal from the inclination angle sensor and a signal from the position sensor, which indicates that the grip portion is moved in an upward direction, are input at the same time, the controller causes the vehicle to accelerate or decelerate and causes the heights of the front or rear suspension units of the vehicle to be increased, and
when the signal from the inclination angle sensor and a signal from the position sensor, which indicates that the grip portion is moved in a downward direction, are input at the same time, the controller causes the vehicle to accelerate or decelerate and causes the heights of the front or rear suspension units of the vehicle to be decreased.

6. The vehicle control device according to claim 4,
wherein when the signal from the inclination angle sensor and the signal from the position sensor, which indicates that the grip portion is moved in the upward direction, are input at the same time, the controller causes the vehicle to accelerate or decelerate and causes the heights of the front or rear suspension units of the vehicle to be increased, and
when the signal from the inclination angle sensor and the signal from the position sensor, which indicates that the grip portion is moved in the downward direction, are input at the same time, the controller causes the vehicle to accelerate or decelerate and causes the heights of the front or rear suspension units of the vehicle to be decreased.

\* \* \* \* \*